United States Patent [19]
Bickle

[11] 3,927,457
[45] Dec. 23, 1975

[54] PIPE-SEATING APPARATUS

[76] Inventor: Alton H. Bickle, 2135 Shadowdale, No. 141, Houston, Tex. 77043

[22] Filed: Nov. 6, 1974

[21] Appl. No.: 521,455

[52] U.S. Cl. .................................. 29/237
[51] Int. Cl.² ........................... B23P 19/04
[58] Field of Search ..................... 29/237, 282

[56] References Cited
UNITED STATES PATENTS

| | | | |
|---|---|---|---|
| 1,615,008 | 1/1927 | Ferguson | 29/237 |
| 3,471,919 | 10/1969 | Evans | 29/237 |
| 3,483,607 | 12/1969 | Madden | 29/237 |
| 3,585,703 | 6/1971 | Goss | 29/237 |
| 3,639,967 | 2/1972 | Brighton | 29/237 |
| 3,710,427 | 1/1973 | Doty | 29/237 |

FOREIGN PATENTS OR APPLICATIONS

| | | | |
|---|---|---|---|
| 990,449 | 4/1965 | United Kingdom | 29/237 |

Primary Examiner—James L. Jones, Jr.
Attorney, Agent, or Firm—Bard, Springs, Matthews & Jackson

[57] ABSTRACT

In one preferred embodiment, pipe-seating apparatus is provided for seating the spigot end of a first pipe section into the hub end of a second pipe section. A collar is provided for engaging the arcuate periphery of the second pipe section abutting the hub shoulder. A transverse first beam is provided to contact and engage the open end of the first pipe section. A second beam spaced from the first beam and parallel thereto is joined to the first beam by means of a suitable jacking means for displacing the beams relative to each other. A cable formed into a U-shaped loop is threaded around the second beam and is attached to the collar by means of a pair of chains. As the first beam is displaced from the second beam by the jacking means and the second beam tensions the cable and chains against the collar, the first beam exerts a driving pressure on the open end of the first pipe section to axially move it into seating engagement with the second pipe section.

52 Claims, 17 Drawing Figures

PIPE-SEATING APPARATUS

BACKGROUND OF THE INVENTION

The present invention relates to apparatus for joining or seating sections of pipe.

Recently the pipe industry has shifted to using a pipe structure having a flexible sealing element inserted into the receiving end of a pipe section, into which the spigot end of another pipe section is axially inserted for effecting a tight seal between the pipe sections and the flexible sealing element, usually of a resilient elastomeric material. This includes various types of pipe, such as cast iron soil pipe for sanitary sewers, cast iron pipe for water mains and concrete, vitrified clay or transite pipe for sewers. Such pipe conventionally have a plain or spigot end and a bell-shaped hub end for receiving the spigot end of an adjoining pipe section. Because of the nature of the gasket seal and the variations in the diameters of the pipe, considerable force is often required to seat the spigot end of one pipe section into the hub of a second pipe section against the sealing gasket.

When joining or seating small diameter pipe, say under 8 inches in diameter, the seating force is often not too great. But other conditions can bear on the ease or difficulty of joining the pipe, such as the condition of the soil in a pipe trench or if the run of pipe is overhead as in building construction. As the size of the pipe increases, the weight of individual pipe sections increases and the seating force required correspondingly increases. A 15-inch cast iron pipe in a standard length of eighteen feet can weight in excess of 1,500 pounds. Seating such pipe sections under poor soil conditions in a pipe trench requires considerable driving force.

The prior art has disclosed a variety of tools for joining small diameter pipe. Such prior art is exemplified by the following U.S. Pat. Nos. 1,615,008; 2,399,312; 2,719,695; 2,793,424; 3,471,919; 3,483,607; 3,571,896; 3,653,115; 3,688,378 and 3,787,951. All of these prior art devices are limited to use on small diameter pipe since they make use of levers and jacks not capable of exerting large driving forces. In addition, most of the devices are complex, heavy and unwieldy to use, even for small pipe, and would be impossible to handle for larger diameter pipe. For larger diameter pipe, such as the 15-inch cast iron pipe above referred to, the prior art has utilized cranes to lift and suspend the pipe sections and manual or mechanical devices to seat the pipe sections. For extremely large diameter pipe, such as 72-inch pipe sections, the prior art has utilized a plurality of jacks to move the pipe sections into a seating relationship. Such prior art solutions have been unsatisfactory because of the high cost of heavy handling equipment and the excess labor and time required to join pipe sections. A pipe-joining machine disclosed in U.S. Pat. No. 3,639,967 utilizes a cable axially threaded through the pipe run and anchored by the first pipe section cooperating with a hydraulic ram device to seat pipe sections, including large pipe sections. However, the apparatus disclosed is extremely complex, bulky and expensive. It is not suited for joining overhead suspended pipe sections.

Accordingly, one feature of the present invention is to provide a portable, relatively light-weight apparatus for seating pipe sections of varying diameter.

Another feature of the present invention is to provide a pipe-seating apparatus that may be equally utilized in seating pipe in underground trenches, suspended overhead or in vertical runs.

Still another feature of the present invention is to provide a pipe-seating apparatus that can join straight pipe having bell-shaped hubs, straight pipe without hub ends and curved pipe sections.

Yet another feature of the present invention is to provide a pipe-seating apparatus that is simple to operate and requires a minimum amount of time to set up.

Another feature of the present invention is to provide a pipe-seating apparatus that exerts the pipe-seating force generally axially of the pipe sections.

SUMMARY OF THE INVENTION

The present invention solves the problems of the prior art by providing a pipe-seating apparatus suitable for joining large and small diameter pipe, whether it is constructed of plastic, transite, cast iron, concrete or vitrified clay. The present invention is portable and equally utilizable for joining pipe in a trench, suspended overhead or in a vertical run. It can also be used for seating straight pipe having a spigot and hub, straight pipe that do not have bell-shaped hub ends or L-shaped hub ends or L-shaped pipe elbows.

In one preferred embodiment for seating the spigot end of a first pipe section into the hub end of a second pipe section, the pipe-seating apparatus has a semicircular collar for engaging the second pipe section abutting the hub, a U-shaped length of cable projecting beyond the open end of the open or hub end of the first pipe section, a pair of chains for connecting the ends of the cable to the collar, and a force-exerting means disposed between the extending loop of the cable and the open or hub end of the first pipe section for tensioning the cable and chains against the collar and driving the first pipe section axially into seating engagement with the second pipe section. The force-exerting means has a transverse first beam member for contacting the end of the first pipe section, a second beam member spaced from and parallel to the first beam member and adapted to slidably engage the looped end of the cable, and driving or jacking means disposed between the first and second beams for exerting a force tending to displace the first beam laterally from the second beam engaging the cable for providing the driving force to seat the first pipe section. The driving or jacking means may be a hydraulic jack, a mechanical ratchet jack or a fluid-actuated cylinder-piston assembly.

For engaging pipe sections not having a hub, the collar is also provided with a gripping chain that can be applied about the lower periphery of the pipe body and attached to ends of the collar to anchor the collar in place when the cable and attached chains are tensioned. Of course, just a chain wrapped about the second pipe section would suffice as a pipe engaging means also.

When seating pipe having radius bends, typically elbow or L-shaped pipe, a preferred embodiment of the invention provides a pair of spaced ribs projecting from the center of the transverse first beam of the force exerting means for accepting and straddling the projecting lug on the surface of the radius bend to prevent transverse sliding of the beam in relation to the pipe section.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

In the drawings.

DETAILED DESCRIPTION OF THE PREFERRED EMBODIMENTS

Referring now to FIGS. 1–5, a preferred embodiment of the pipe-seating apparatus 10 according to this invention will be discussed in detail. Two soil pipe sections to be seated are shown, a first pipe section 11 having a spigot end 15 for seating in a bell-shaped hub 14 of a second pipe section 12. A conventional flexible plastic seal 16 is shown disposed in hub 14 of pipe 12 for sealing the end 15 of pipe 11 into hub 14.

Figure 1:
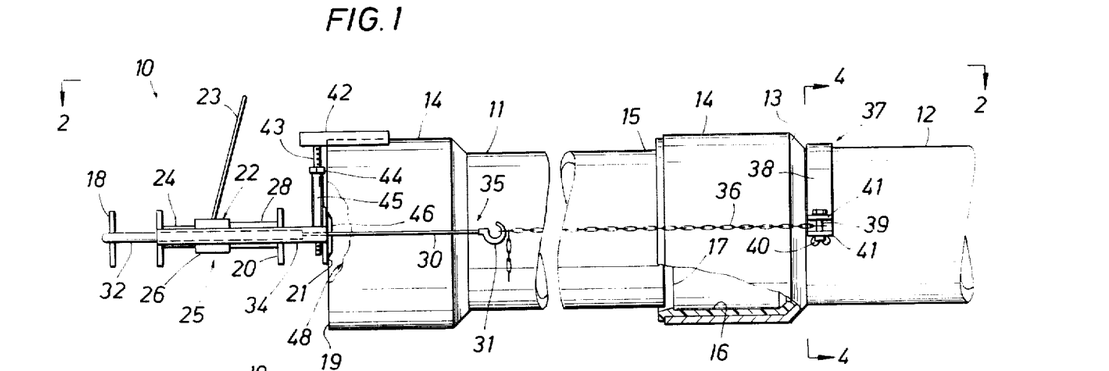
FIG. 1 is a side elevational view (partly in cross-section) of the pipe-seating apparatus according to this invention engaging two unseated pipe sections.
Figures 2, 3, 4, 5, 6:
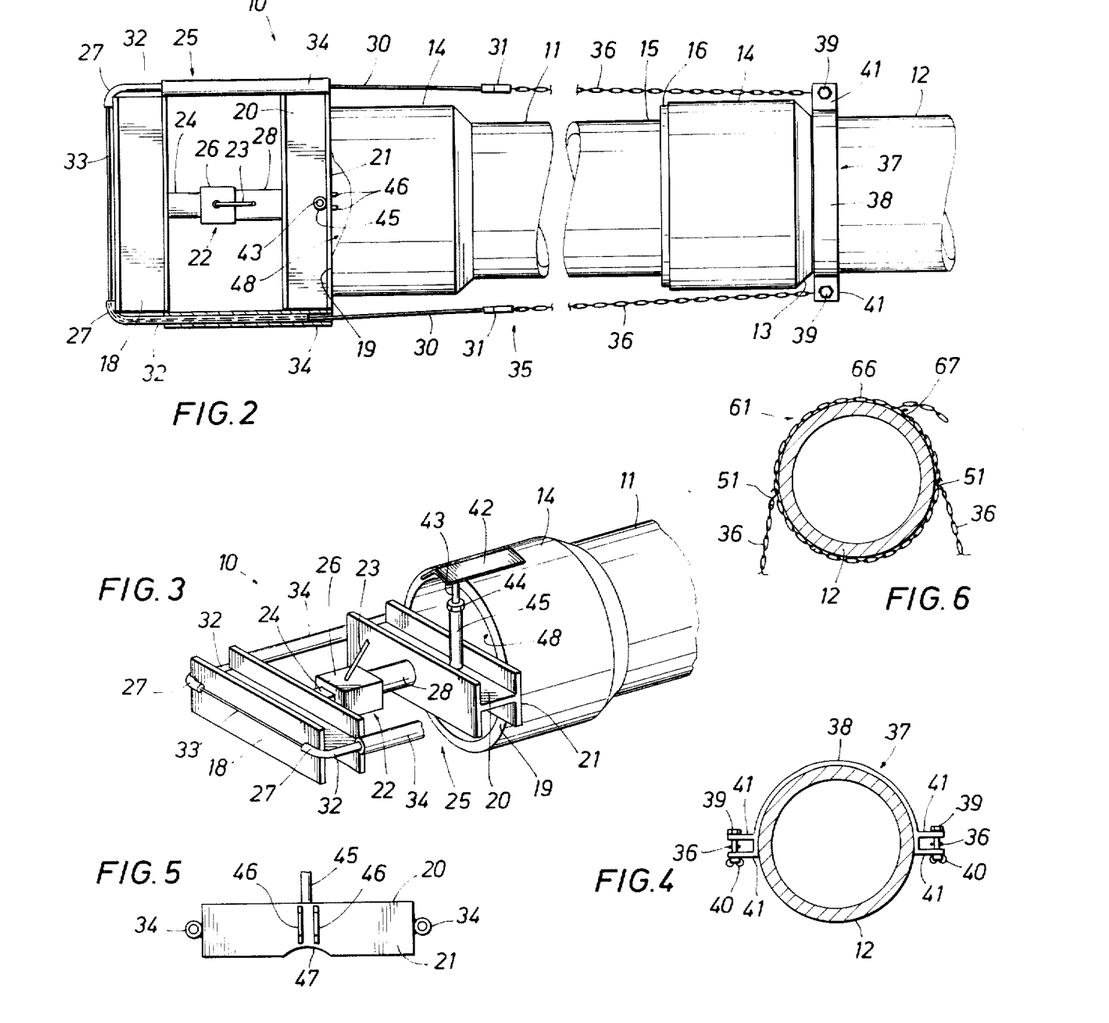
FIG. 2 is a plan view (partly in cross-section) of the pipe-seating apparatus according to this invention engaging two unseated pipe sections.
FIG. 3 is a partial perspective view of the tensioning cable and the force-exerting means engaging the cable and the end of one of the pipe sections.
FIG. 4 is a vertical cross-sectional view of a pipe showing one embodiment of the pipe engaging means engaging the pipe surface as taken along lines 4—4 of FIG. 1.
FIG. 5 is an elevational view of the engaging surface of the first transverse beam member of the force exerting means.
FIG. 6 is a vertical cross-sectional view of a pipe showing another embodiment of the pipe engaging means engaging the pipe surface.

The pipe-seating apparatus 10 comprises a pipe-engaging means 37 securely engaging pipe section 12 and connecting means 35 attachable to the pipe-engaging means 37, as will hereinafter be further described, and adjustable in length for forming a looped end 33 projecting axially beyond the hub end 14 (the other open end) of pipe section 11. Apparatus 10 also includes force-exerting means 25 disposed between and engaging the looped end 33 of connecting means 35 and the end 19 of hub end 14 of pipe 11. The force-exerting means 25 tensions the connecting means 35 with respect to the pipe-engaging means 37, as will hereinafter be further described, for exerting a force directed generally axially of pipe sections 11 and 12 against the open end 19 of pipe 11 for driving the spigot end 15 of pipe 11 into seating engagement with the hub end 14 of pipe 12.

One preferred embodiment of the pipe-engaging means 37 includes a semicircular metal collar 38 adapted for fitting over and contacting the outer surface of an arcuate section of pipe 12 abutting the slanting surface portion 13 of hub 14. The ends of the collar member 38 terminate on opposite sides of pipe 12 approximate the center line thereof. The ends of collar 38 terminate in attaching means comprising a pair of spaced radially projecting flanges 41 having registering apertures (not shown) centrally therethrough for accepting a bolt 39. Bolt 39 engages a selected link of one of the chains 36 comprising the connecting means 35, as will hereinafter be further described, to releasably attach the chain 36 to one end of collar 38.

Connecting means 35 consists of a cable 30 having chain hooks 31 attached to each end of the cable, and a pair of chains 36, each one of which is attached at one end to the cable hooks 31 with the other end inserted between flanges 41 of collar 38 and for engaging the bolt 39 to secure the chains to the ends of collar 38. (See FIG. 4) The length of the looped cable 30 and attached chains 36 can be adjusted by adjusting the length of the chain engaged between hooks 31 and the collar-attaching bolts 39. It is not necessary, but it may be desirable to utilize a conventional securing means, such as a nut or easily removable wing nut 40, for securing bolts 39 in spaced flanges 41.

Force-exerting means 25 comprises three basic components a first beam member 20, a second beam member 18 and carrying a pair of J-shaped tubular sections 32, and a driving means 22 disposed between first and second beams 20 and 18 for exerting a horizontal force for tensioning cable 30 and chains 36 and displacing the first beam 20 from the second beam 18, restrained from movement by means of a tensioned cable 30, for driving the spigot end 15 of pipe 11 into the hub end 14 of pipe section 12.

First beam member 20 has a surface 21 adapted for contacting and engaging the open end 19 of pipe 11. Beam 20 is preferably sized according to the diameter and weight of the pipe sections 11 and 12 that are being seated. The heavier the pipe sections, the heavier and more rugged the construction of beam member 20. Although an I-beam is shown in the drawing, any suitable beam or cross member may be utilized provided it has a contacting surface 21 adapted for contacting and engaging the open end 19 of pipe section 11 and is sufficiently rigid to withstand the driving pressures. The length of the beam 20 is dependent on the diameter of the pipe, and the beam should project beyond the outer surfaces of the pipe 11 on either side of open end 19 for purposes to be hereinafter further described.

Second beam member 18 is spaced from the first beam 20 and positioned parallel thereto. Beam 18 may preferably be of the same construction and material as the first beam 20. Attached to each end of the second beam 18 is a J-shaped tubing section 32. The pair of tubing sections 32 are fixed to each end of beam 18 by conventional attaching means, such as welding or brazing, and are positioned with straight portions of the tubing 32 extending toward first beam member 20 and the curved ends 27 projecting around the ends of the second beam member 18 in a facing spaced relationship for forming a generally U-shaped guide through which cable 30 is threaded to form the looped end 33. Curved ends 27 of tubes 32 provide a bearing surface for cable 30 and allow cable 30 to slide with respect to the second beam 18 when the cable 30 and chains 36 are tensioned in order to allow equalizing of the tension forces in each extending end of the cable and each attached chain. Such equalization of the forces in cable 30 and chains 36 insures that the driving forces on first beam 20 will be equalized in the direction of axial movement of pipe 11 and will prevent unbalanced forces that may tend to skew pipe 11 and fail to seat it properly in pipe 12.

Driving means 22 is attached between beams 18 and 20 and exerts a laterally displacing force between second beam 18 and first beam 20 to force beam 18 with attached J-shaped tubing sections 32 into engagement against loop 33 of cable 30, thereby tensioning cable 30 and chains 36 against collar member 38. Collar member 28 abuts the shoulder or slanted surface 13 of hub 14 of pipe section 12 and is thereby restrained from lateral movement. With continued lateral force exerted by driving means 22, the first beam 20 is displaced with respect to second beam 18, thus driving the engaged pipe section 11 axially into the hub or receiving end 14 of pipe 12. Driving means 22 may take the form of several jacking means.

One embodiment of such a jacking means may include a conventional mechanically operated ratchet jack having a jack head assembly 26 adapted for movement along a ratchet bar 24, one end of which is attached to the second beam member 18. The jack head 26 could be spaced from and attached to the first beam member 20 by means of a sleeve 28 that encircles ratchet bar 24 and permits coaxial movement therein. The jack is operated by means of a manually operated lever or bar 23 that causes the jack head 26 to engage and move with respect to ratchet bar 24 in a conventional manner for applying a jacking force for displacing first beam 20 with respect to second beam 18. A second embodiment of the jacking means 22 could be a hydraulic jack and cylinder 26 and 28 attached to the first beam 20 and an extensible piston 24 for engaging the second beam 18. Hydraulic jack 22 may be operated by mechanical lever 23.

In addition, the first beam member 20 has attached thereto at each end straight tubing sections 34 that extend toward the second beam 18 and are concentrically disposed over the straight extending portions of the J-shaped tubes 32. Tubing sections 34 thus operate with J-shaped tubes 32 for guiding lateral movement between beams 18 and 20 along the axes of tubes 32 and 34, and prevent relative rotational movement between the second beam 18 and the first beam 20 when a driving force is exerted by driving or jacking means 22.

To center and support force-exerting means 25 in engaging contact centrally of open pipe end 19, a positioning means is provided that comprises support bar 42 spaced from the first beam 20, connecting rod or bolt 43, sleeve 45 and nut 44, all adjustably mounted on the first beam member 20. The support bar 42 can be a length of steel angle that self-centers on the arcuate surface of pipe hub 14. The support bar 42 extends forwardly of the pipe-contacting surface 21 of first beam 20 for engaging the surface of the hub or open end 14 of pipe 11. One end of bar 42 is fixed to one end of a threaded connecting rod 43 which extends downwardly toward the first beam 20. Centrally of first beam 20 an aperture (not shown) is provided and a cylindrical tube 25 is fixed transversely to the beam 20 registering with the aperture. A nut 44 is fixed to the extending end of the tube 45 and accepts the threaded end of the rod or bolt 43.

The relative spacing of support bar 42 and the first beam 20 can be adjusted by means of the threaded rod or bolt 43 and nut 44 for positioning the contacting surface 21 of the first beam member 20 centrally of the rim 19 of the hub or open end 14 of pipe 11. It is desirable for beam 20 to centrally contact rim 19 in order to direct the driving force for seating pipe sections 11 and 12 axially of the pipe sections.

The pipe-contacting surface 21 of first beam member 20 is provided with a pair of projecting parallel ribs 46 positioned in the center of the beam face 21, as may be seen in FIGS. 1, 2 and 5. The ribs project about one-half inch and are spaced apart about one-half inch for accommodating and engaging a projecting lug 130 disposed on the outer radius of the arcuate bend of an elbow or L-shaped pipe (see FIG. 5) for purposes to be hereinafter further described. When seating straight pipe sections like pipes 11 and 12, the ribs project into the interior opening 48 of the open end 14 of the pipe contacted by beam member 20. The lower edge of pipe-contacting surface 21 of beam member 20 has an arcuate cut-out portion 47 for purposes to be herein further described.

While the apparatus, especially first beam 20 and second beam 18, have been described as constructed of steel, any other suitable metal or material may be used having sufficient strength and durability to withstand the forces encountered in seating pipe sections. For instance, for pipe sections of small diameter, say under eight inches, or light weight pipe such as plastic pipe, the major components may be constructed of light-weight materials such as aluminum or aluminum alloys or magnesium. Such light-weight materials will aid portability and enhance the use of the apparatus in seating pipe sections in suspended overhead runs where it is difficult to work and heavy equipment is dangerous.

FIG. 6 illustrates a second embodiment of the pipe-engaging means 61 comprising a length of engaging pipe chain 66 for encircling pipe 12. Chain 66 can be wrapped around pipe 12 and secured by any suitable fastening means such as a chain hook 67. Chains 36, previously described in relation to the invention embodiment described in FIGS. 1–5, may be attached to the pipe chain 66 on either side of pipe 12 by means of any suitable removable attaching means such as chain hooks 51. Chain 66 does not have to be tensioned since any slack will be taken up by the tensioning of chains 36 and the chain 66 will, under such tension, securely grip pipe 12.

Figure 7:
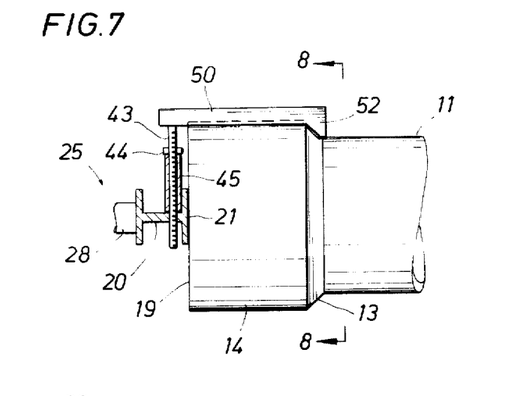
FIG. 7 is a side elevational view of a second embodiment of a positioning means for supporting the force-exerting means of the pipe-seating apparatus in contact with the open end of the pipe.
Figure 8:
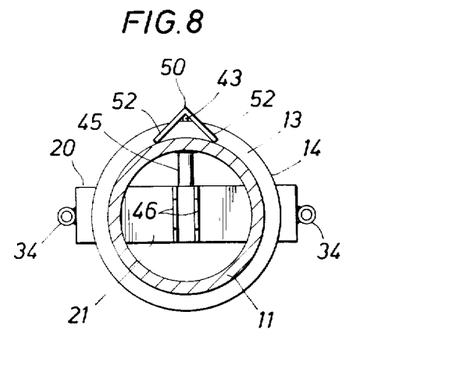
FIG. 8 is a cross-sectional view of the second embodiment of the positioning means shown in FIG. 7 and taken along lines 8—8 of FIG. 5.

FIGS. 7 and 8 show another embodiment of the positioning means for supporting the first beam member 20 across the desired center line axis of rim 19 of pipe 11 for the reasons above described. A fragmentary view of the force-exerting means 25 is shown, including first beam member 20, all of the other members and components being identical to those above discussed with respect to FIGS. 1 through 5. When seating runs of straight pipe 11 having end hubs 14 with slanted shoulders 13, a supporting bar 50 can be utilized in place of the shorter supporting bar 42 (shown in FIGS. 1–5). Bar 50 is constructed of steel angle with a pair of extending flanges 52 shaped to frictionally engage the slanted shoulder 13 of hub 14. The flanges 52 engage and grip shoulder 13 for supporting beam 20 and the remainder of means 25 in the desired position axially of pipe 11. The threaded rod or bolt 43, sleeve 45 and nut 44 are identical in construction and function to the same parts hereinabove described and will not be further discussed.

Figure 9:
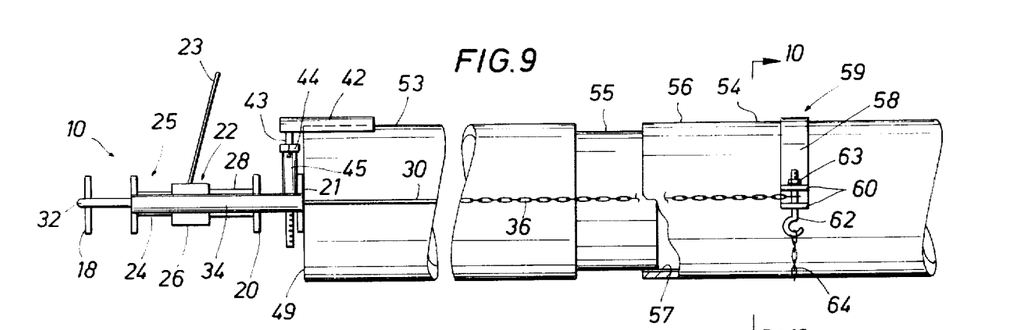
FIG. 9 is a side elevational view (partly in cross-section) of the pipe-seating apparatus according to this invention utilizing a third embodiment of the pipe-engaging means for use with pipe sections not having a bell-shaped hub.
Figures 10, 13, 14, 15, 16, 17:
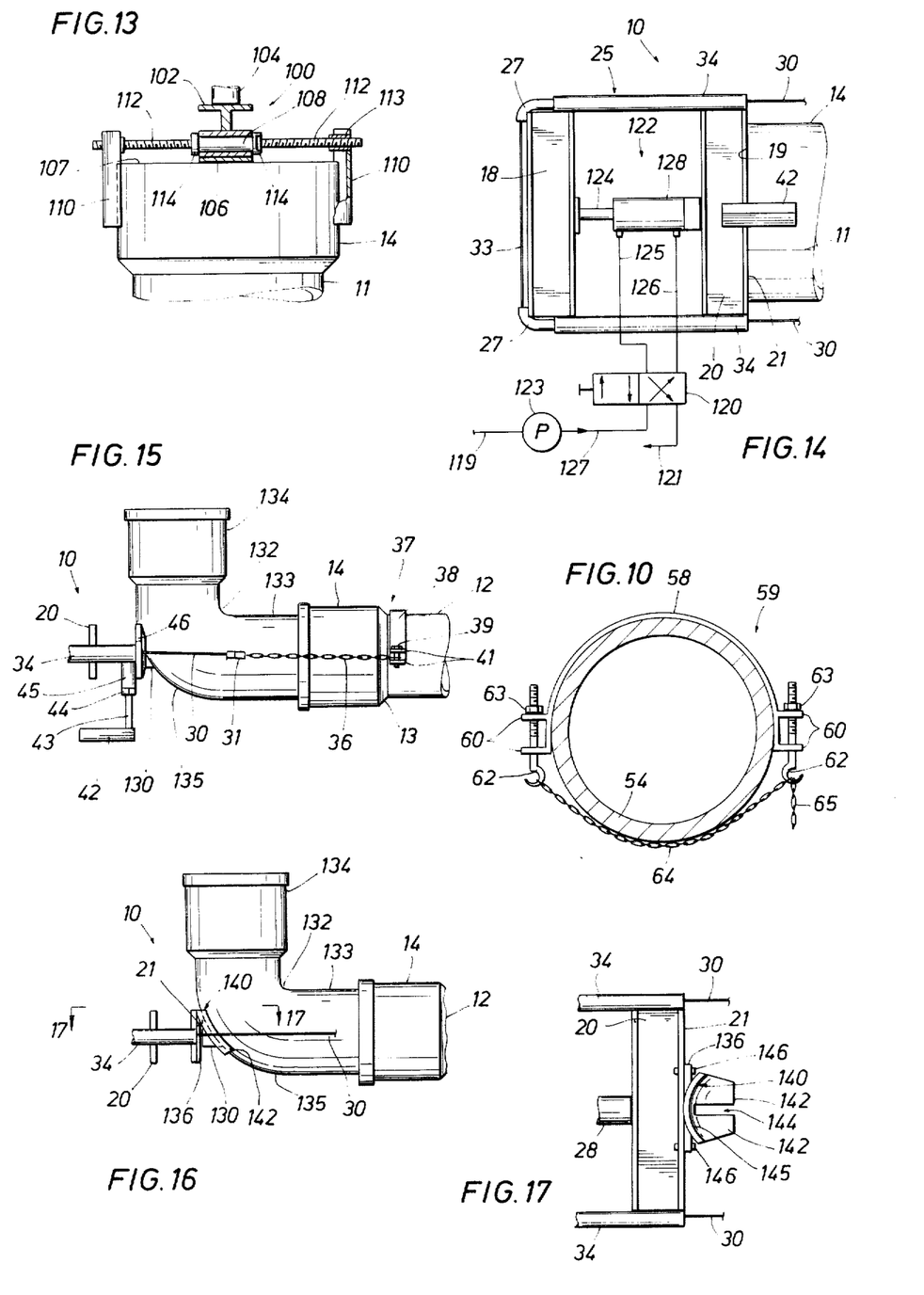
FIG. 10 is a vertical cross-sectional view of a pipe showing the third embodiment of the pipe-engaging means engaging the pipe surface as taken along lines 10—10 of FIG. 9.
FIG. 13 is a side elevational view of a third embodiment of a positioning means for supporting the force-exerting means of a pipe-seating apparatus that is particularly useful when seating vertical runs of pipe.
FIG. 14 is a partial plan view, partly in schematic, of the force-exerting means of the present invention illustrating one embodiment of the driving means.
FIG. 15 is a side elevational view of one embodiment of the pipe-seating apparatus according to this invention adapted for seating L-shaped or elbow pipe sections.
FIG. 16 is a side elevational view of a second embodiment of the pipe-seating apparatus according to this invention adapted for seating L-shaped or elbow pipe sections.
FIG. 17 is a plan view of the second embodiment of the pipe-seating apparatus for seating L-shaped or elbow pipe sections shown in FIG. 16.

The previous description of the invention has been made with reference to seating pipe sections that have a spigot end and an opposing bell-shaped hub end. However, when seating pipe having no bell-shaped hub, as commonly found in certain types of concrete soil or drain pipe, the pipe-engaging means utilized with the invention must be modified. Referring now to FIGS. 9 and 10, two soil pipe sections without bell-shaped hubs, 53 and 54, are shown. The first pipe section 53 has a spigot or recessed end 55 for mating with the receivng end 56 of the second pipe section 54. Pipe-seating apparatus 10 is identical to the pipe-seating apparatus 10 described above with regard to FIGS. 1–5 and will not be further described.

Pipe-engaging means 59 consists of a semicircular collar 58, identical to collar member 38 previously described, a pipe gripping chain 64 and attaching means disposed on the ends of collar 58 comprising a pair of radially extending spaced flanges 60 and a hooked bolt 62. Gripping chain 64 is disposed about the lower periphery of pipe section 54, opposing collar 58, for attachment to opposite ends of collar 58 for gripping the surface of pipe 54 and anchoring collar 58 in place. Selected links of gripping chain 64 are engaged by the hooked bolts 62 for pulling the gripping chain 65 snug against the lower periphery of pipe 54. The threaded ends of hook bolts 62 are inserted through registering apertures (not shown) centrally disposed in flanges 60 for engaging links of the cable chain 36 inserted in the space between flanges 60. The threaded ends of bolt 62 are secured by means of a threaded fastener such as nut 63. The threaded ends of bolts 62 may be adjustably threaded through nuts 63 to apply the desired degree of tension on gripping chain 64 to frictionally engage the surface of pipe 54 and to apply downward force on collar 58 for causing collar 58 to frictionally engage the surface of pipe 54 for anchoring the pipe-engaging means 59 to pipe section 54. The first beam 20 of force-exerting means 25 is positioned, in the manner previously described, in contact with the surface 49 of the other open end of pipe 53 for applying a driving force to pipe 53 for seating end 55 in pipe 54 against an interior conventional seal 57. Of course, pipe engaging means 61 as illustrated in FIG. 6 may alternatively be employed in place of pipe-engaging means 59.

Figure 12:
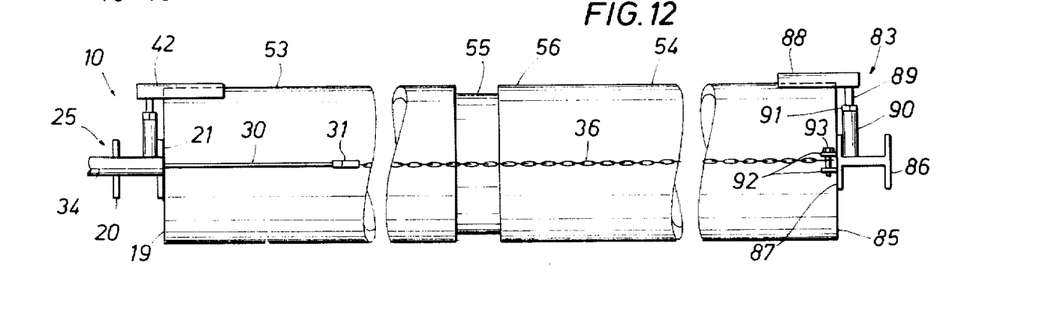
FIG. 12 is a side elevational view of a fourth embodiment of a pipe-engaging means for engaging the end of a pipe section not having a hub end.

In FIG. 12 another embodiment of a pipe-engaging means 83 for use with pipe not having bell-shaped hubs is shown. Two pipes 53 and 54 are shown being prepared for axial seating. Force-exerting means 25 of pipe-seating apparatus 10 is shown engaging the end surface 49 of pipe 53 and supported by bar 42 as hereinabove described in conjunction with earlier figures illustrating the invention and will not be described in greater detail. Pipe-engaging means 83 comprises a cross bar or beam 86 having a surface 87 for contacting and engaging the end surface 85 of pipe section 54. The cross bar 86 may have a similar or identical construction as beam 20, as hereinabove described as a component of force-exerting means 25. The crossbar 86 has attached to each end thereof a pair of spaced flanges 92 having registering apertures therethrough (not shown) for accepting a pin or bolt 93. The flanges 92 and bolt 93 function as attaching means fixed to the ends of crossbar 86 to accommodate and secure one end of chain 36 as previously described in connection with other pipe-engaging means embodiments 37 and 59.

A positioning or supporting device may be utilized in connection with crossbar 86 that is similar or identical to the positioning means hereinabove described in connection with a description of the invention shown in FIGS. 1–5. A support bar 88 is spaced from crossbar 86 and extends forwardly therefrom to engage the surface of the end of pipe 54. Bar 88 is adjustably attached to crossbar 86 by means of a threaded depending bolt 89 attached to one end of bar 88 that engages a threaded fastener or nut 91 fixed to the end of a support tube 90. Tube 90 is fixed centrally of crossbar 86 and projects transversely upwardly therefrom in registration with an aperture (not shown) in crossbar 86 for accommodating bolt 89. Support bar 88 may be adjustably displaced in relation to crossbar 86 for supporting crossbar 86 in a position contacting end surface 85 that is approximate the center line of pipe 54 for causing the driving force of force-exerting means 25 to be directed axially of pipes 53 and 54.

Pipe-engaging means 83 will have limited used since it can be utilized only on short runs of pipe because it must remain in contact with the end surface 85 of pipe 54 for seating pipe 53 and all subsequent pipe sections. Its usefulness is also limited by the lengths of chains 36 which must be long enough to accommodate all new pipe sections seated.

Figure 11:
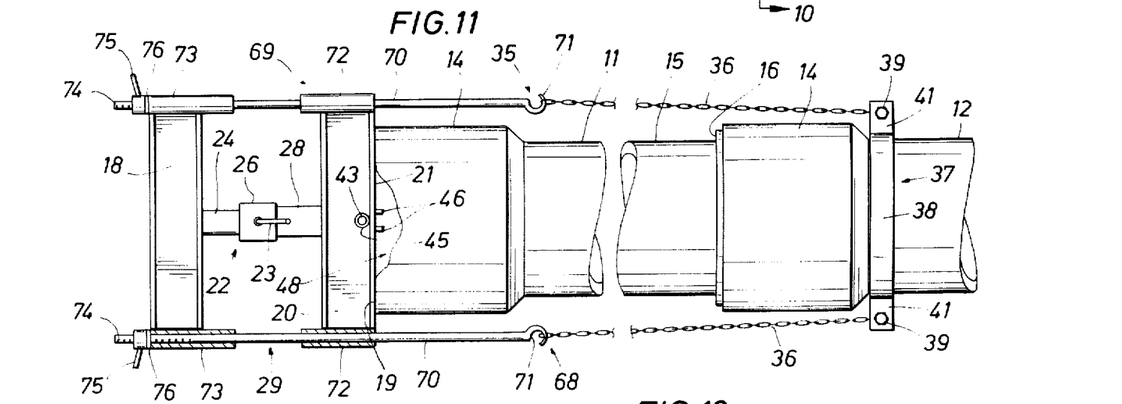
FIG. 11 is a plan view (partly in cross section) of the pipe-seating apparatus according to a second embodiment of this invention for engaging two unseated pipe sections.

In FIG. 11, a second embodiment 69 of the pipe-seating invention is shown for seating conventional pipe, such as pipe sections 11 and 12. First pipe section 11 has a spigot end 15 for seating into the hub end 14 of second pipe section 12 against a conventional seal as earlier described. A pipe-engaging means 37 comprising a collar 38 is utilized and is identical to pipe-engaging means 37 previously described in connection with FIGS. 1–5 and will not be further described. Of course, pipe-engaging means 59 or 61 may alternatively be utilized in place of pipe-engaging means 37.

Force-exerting means 29 is similar in construction to force-exerting means 25 hereinabove described and comprises a first beam member 20 having a surface 21 adapted for engaging the rim or end surface 19 of the open end of pipe 11 in the same manner as hereinabove described for the first embodiment 10. A second beam member 18 is spaced in parallel relationship from the first beam 20 and the beams are interconnected by means of jacking means 22 identical to the jacking means 22 previously described in connection with the first embodiment 10 relating to FIGS. 1–5 and will not be described in greater detail.

As previously described in connection with the first embodiment 10, beams 18 and 20 are of such a length to extend beyond the diameter of pipe 14 for purposes of accommodating connecting means 68 to be hereinafter described in greater detail. Attached to each end of second beam 18 is a sleeve 73 projecting laterally toward beam 20 and generally parallel to pipe section 11. Connecting means 68 connects force-exerting means 25 and pipe-engaging means 37 for tensioning the connecting means 68 against engaging means 37 to restrain movement of beam 18, thereby providing the driving force from jacking means 22 to be applied to drive beam 20 forward and axially seating pipe 11 into pipe 12. Connecting means 68 comprises a pair of elongated rods 70 and connecting chains 36 for attachment between beam 18 and pipe engaging means 37.

Rods 70 have a threaded end 74 and a suitable means for attachment to chains 36, such as a hook 71. The threaded end of the rods 70 are slipped through sleeves 73 and project beyond sleeve 73 and beam 18. Chains 36 are attached to pipe-engaging means 37 in a manner as hereinabove described. Threaded handles 75 are attached to the projecting ends 74 of rods 70 for seating against sleeve 73 or a specially provided tubular bearing section 76 for longitudinally adjusting the length of hooked end 71 of rod 70 projecting parallel to pipe section 11, thereby taking up slack in chains 36 and applying tension to the connectng means comprising rods 70 and 36 between pipe-engaging means 37 and second beam 18 of the force-exerting means 29. In this manner selected tension can be manually applied to each rod 70 and chain 36 to prevent movement of beam 18 and permitting driven beam 20 to seat pipe 11 into pipe 12. Rods 70 may be of any suitable material, such as steel rod that can withstand the tension forces applied in seating the pipe sections. The length of the rods 70 is not critical and they may be of any convenient length consistent with ease of handling the equipment.

Guide means may also be provided to prevent rotational displacement of beams 18 and 20 during the time the driving force is applied by jacking means 22. Such guide means could comprise tubular sections 72 fixed to each end of beam 20 and axially slidable over rods 70. Tubular sections 72 cooperating with rods 70 will allow lateral displacement of first and second beams 18 and 20 but will restrain relative rotational movement between the beams during the tensioning and seating procedure.

The previous descriptions of the invention have assumed that the pipe was being seated in horizontal runs. However, the invention as hereinabove described may be utilized for seating pipe in vertical runs as often called for in assembling drainpipe in buildings. That is one of the advantages of the pipe-seating apparatus according to this invention; it is versatile and can be used in all applications of seating pipe, both horizontally and vertically. However, in seating vertical runs of pipe 11, it may be preferred to use another embodiment of the positioning means for positioning a force-exerting means 100 in contact with the end surface 107 of pipe hub or open end 14 as shown in FIG. 13. A beam member 102, corresponding to beam 20 previously described in connection with other embodiments, having a beam face 106 is positioned in contact with the end surface 107 of pipe 11. Disposed transversely through beam 102 is a sleeve 108 for accepting a threaded rod 112. Rod 112 may be attached to beam 102 by any conventional means, such as screw fasteners or locking nuts 114 which cooperate with sleeve 108 to lock rod 112 in place. A pair of suppoprt bars 110, having a threaded sleeve 113 fixed to one end thereof for adjustably engaging the threaded rod 112 are positioned in a spaced relationship on opposite sides of beam 102 in attachment with rod 112 for engaging the outer surface of end 14 of pipe 11 at spaced locations. The support bars 110 may be metal angle or other rigid material of suitable cross-section adapted for contacting and engaging the surface of pipe 11.

Utilizing the supporting means above described in connection with FIG. 13, the supporting bars 110, connected to beam 102 of force-exerting means 100, stabilize force-exerting means 100 and prevent slipping of beam 102 relative to the end pipe surface 107. The support bars may be repositioned along rod 112 to accommodate various diameter pipe.

Referring now to FIG. 14, another embodiment of the driving or jacking means 122 of force-exerting means 25 or 29 is shown. The beam member 20 of force-exerting means 25 is shown in contact with the end surface 19 of pipe 11. Beam 20 is supported by support bar 42, as previously described. The beam 18 with attached J-shaped tubes 32, guide tubes 34 attached to beam 20, and the cable 30 are all identical to the parts previously described having the same reference numbers and function in an identical manner.

Driving means 122 comprises a fluid-actuating piston-cylinder assembly having a cylinder 128 attached to first beam 20 and a piston shaft 124 attached to the second beam 18. A source of fluid, such as air, gas or hydraulic fluid (not shown) provides fluid to pump 234 through a tubing 119. The pump delivers pressurized fluid to a four-way valve 120 through a tubing 127. A tubing 121 from valve 120 is a return line to return fluid from cylinder 128 through valve 120 to the fluid source (not shown). Tubings 125 and 126 interconnect cylinder 128 and valve 120 to control the actuation of the piston. In the position of control valve 120 shown, pump 123 delivers pressurized fluid through tubing 127 to valve 120 and then through tubing 126 to cylinder 128 for driving piston shaft 124 outwardly, thus displacing first beam 20 from second beam 18 to tension cable 30 and seat pipe 11 as hereinbefore described. The fluid displaced in cylinder 128 is forced through tubing 125, valve 120 and tubing 121 to the fluid source (not shown). When valve 120 is positioned in its second position, the pump 123 delivers pressurized fluid through tubing 127 to valve 120 and then through tubing 125 to cylinder 128 to retract rod 124. Excess fluid in cylinder 128 passes through tubing 126, valve 120 and return line 121 to the fluid source (not shown). Of course, the necessary force to drive pipe 11 into seating engagement with a second pipe 12 (See FIG. 1) varies dependent on the weight of the pipe section, which is directly related to pipe diameter, pipe section length and the pipe material. A 2,000 lb. driving force should be sufficient for all pipe up to and including 18-inch steel or concrete pipe in 10–15 foot lengths. Of course, where only smaller pipe, such as 2 to 8-inch pipe will be seated, the driving pressures can be reduced.

As hereinabove described, pipe-contacting surface 21 of beam 20 has a pair of spaced ribs 46 located in the center of beam 20 and lying transverse to the face 21 of beam 20. These ribs are utilized when the pipe-seating apparatus 10 is used to seal "elbow" or L-shaped pipe 132 having an outer radius bend 135 and a projecting lug 130. Pipe 132 has a spigot end 133 for seating in the hub 14 of pipe 12. The elbow pipe 132 generally has a hub 134 disposed on its other end. For utilizing apparatus 10 for seating pipe 132, a pipe engaging means 37, comprising collar 38 having radial flanges 41 disposed on each end thereof and bolt 39, is positioned on pipe 12 abutting the shoulder 13 of hub 14. Of course, pipe engaging means 59 or 61 may also be employed. Beam member 20 is placed in contact with radius bend 135 of pipe 132 with ribs 46 straddling lug 130. The cable 30 and chains 36 are attached to collar 38 by means of bolts 39, as hereinabove previously described for seating straight pipe sections. Since the ribs 46 are centered on beam 20, the beam will be centered on pipe 132, thus equalizing the tension forces acting on the cable 30 and preventing "see-sawing" of the beam 20 on pipe 132.

The projecting ribs 46 straddle lug 130 and engage the lug for preventing sliding of the beam 20 relative to pipe 132 while the driving force is being applied. Since the support bar 42 and extending rod 43 may interfere with proper seating of beam 20 against pipe 132, it may be preferable to run beam 20 upside down, thus displacing bar 42 and rod 43 away from pipe section 132 as shown. In addition, to accommodate the radius bend 135 of pipe 132, the upper portion of pipe 132 will be accommodated by the arcuate cut 47 (see FIG. 5) to enable the beam 20 to fit squarely against pipe 132 to maintain tubings 34 parallel with cable 30. Of course, the second embodiment of the seating invention 69 may be utilized in the identical manner just described for the first embodiment 10.

Another embodiment of the present invention for engaging L-shaped pipe 132 is disclosed in FIGS. 16 and 17. A shoe member 140 is provided for attachment to the pipe-contacting surface 21 of beam 20. Shoe 140 has a backing plate 136 and may be attached to the center of surface 21 by any conventional attaching means, such as welding for permanent attachment, or made removably attachable by suitable attaching means such as bolts 146. The shoe 140 would not interfere with seating of straight pipe, since the shoe 140 would project into the interior of the open pipe end. Shoe 140 is dished with a concave surface 145 adapted for contacting the surface of radius bend 135 of pipe 132. The body of shoe 140 protrudes forwardly of beam 20 and has a pair of extending members 142 separated by a central slot 144. Slot 144 accommodates lug 130 and permits the curved surface 145 of shoe 140 to contact and frictionally engage the surface of radius bend 135. Slot 144 accepts lug 130 and engages the lug to prevent transverse sliding of shoe 140 and beam 20 with respect to pipe 132 during seating.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. A pipe-seating apparatus for seating the spigot end of a first pipe section into the hub or receiving end of a second pipe section against a flexible seal, comprising
    pipe-engaging means for securely engaging the second pipe section,
    driving means having a first member for engaging the other open end of the first pipe section and a second member spaced and axially displaceable therefrom in a direction generally axially of said pipe sections,
    force-exerting means disposed between and interconnecting said first and second members of said driving means for exerting a generally axial force for laterally displacing said first and second members,
    connecting means for interconnecting said pipe-engaging means and said second member of said driving means, said connecting means being substantially non-extensible under tension for preventing displacement of said second member, said displacing force exerted by said force-exerting means between said first and second members laterally displacing said first member and axially driving the first pipe section spigot end into the hub or receiving end of the second pipe section, and
    guide means cooperating with said first and second beam members and said connecting means for preventing rotational movement of said first beam member with respect to said second beam member during displacement.

2. The apparatus defined in claim 1, wherein said driving means comprises
    a first beam member having a surface adapted for contact with said other open end of the first pipe section, and
    a second beam member spaced from said first beam member and adapted for lateral displacement therebetween in a direction generally axially of said pipe sections.

3. The apparatus as defined in claim 2, wherein said connecting means comprises
    a length of cable formed into a generally U-shaped loop having a pair of extending ends, the U-shaped loop portion of said cable adapted for engaging said second beam member of said driving means, with extending ends of said cable positioned on opposite sides of the first pipe section, and
    a pair of chains, one end of each of which is attached to one of said extending ends of said cable and the other end of said chains removably attachable to said pipe-engaging means on opposite sides of said second pipe section, each of said chains cooperating with said pipe-engaging means for permitting adjustment of the length of said chains.

4. The apparatus defined in claim 3, wherein said second beam member further includes a pair of J-shaped tubing sections each fixed to opposite ends of said second beam member with the straight portion of said J-shaped tubing sections extending toward said first beam member and the curved ends of said J-shaped tubing sections projecting around the ends of said second beam member in a facing spaced relationship for forming a generally U-shaped guide for carrying and engaging said cable threaded therethrough and permitting sliding of the cable under tension to equalize the tension forces acting in the cable and attaching chains.

5. The apparatus defined in claim 2, wherein said force-exerting means comprises jacking means disposed between and attached to said first and second beam members.

6. The apparatus defined in claim 5, wherein said jacking means comprises a mechanically operated hydraulic jack.

7. The apparatus defined in claim 5, wherein said jacking means comprises a mechanically operated ratchet jack.

8. The apparatus defined in claim 5, wherein said jacking means comprises
- a fluid-operated piston and cylinder assembly,
- a source of pressurized fluid connected to said piston and cylinder assembly, and
- valve means interconnected between said fluid source and said piston and cylinder assembly for controlling the operation of said assembly.

9. The apparatus as defined in claim 4, wherein said guide means comprises a pair of straight tubing sections fixed to opposite ends of said first beam member for extending toward said second beam member and disposed concentrically over the extending portions of said J-shaped tubing sections projecting from said second beam for permitting lateral displacement between said first and second beam members along the axes of said J-shaped and straight tubing sections and preventing relative rotational motion between said first and second beam members.

10. The apparatus as defined in claim 2, wherein said driving means further includes positioning means attached to said first beam member for supporting said driving means on said other open end of the first pipe section and positioning said first beam member to engage said other open end of the first pipe section for exerting said driving force generally axially of said first pipe section.

11. The apparatus as defined in claim 10, wherein said positioning means comprises
- a support bar spaced from said first beam member and extending forwardly therefrom for engaging the outer surface of said other open end of the first pipe section,
- a connecting member fixed to said support bar and extending therefrom toward said first beam member, and
- adjusting means fixed to said first beam member and cooperating with said connecting member for adjusting the spacing between said support bar and said first beam member for positioning said first beam member centrally of said other open end of the first pipe section.

12. The apparatus as defined in claim 11, wherein said connecting member comprises a threaded rod, and said adjusting means comprises
- a cylindrical tube fixed centrally and transversely to said first beam member and registering with an aperture in said first beam member, the extending end of said threaded rod insertable through said tube and said beam member aperture, and
- a threaded nut fixed to the extending end of said tube for accepting and adjustably engaging said threaded rod.

13. The apparatus as defined in claim 10, wherein said positioning means includes
- a first support bar spaced from one side of said first beam member and extending forwardly therefrom for engaging the outer surface of said other open end of the first pipe section at a first location,
- a second support bar spaced from the other side of said first beam member and extending forwardly therefrom for engaging the outer surface of said other open end of the first pipe section at a second location,
- a rod attached centrally to said first beam member and extending from opposite sides thereof to engage one end of said first and second support bars, and
- adjustable means fixed to said one end of each of said first and second support bars for accepting and adjustably engaging said rod.

14. The apparatus as defined in claim 12, wherein the other open end of said first pipe section terminates in a bell-shaped hub and said support bar further includes engaging means for engaging the slanted shoulder of said hub end of said first pipe section for supporting said first beam member in engaging contact with said hub end of said first pipe section.

15. The apparatus as defined in claim 14, wherein said engaging means comprises a pair of spaced flanges depending from the other end of said support bar and adapted for frictionally engaging said slanted shoulder of said first pipe section hub.

16. The apparatus as defined in claim 3, wherein said pipe-engaging means comprises
- a semicircular collar adapted for frictionally engaging the slanted surface of the hub end of the second pipe section, the ends of said collar terminating on opposite sides of said second pipe section approximate the center line thereof, and
- attaching means disposed on the ends of said collar for releasably attaching each of said ends of said collar to one of said chains of said connecting means.

17. The apparatus defined in claim 16, wherein said attaching means comprise
- a pair of radially projecting spaced-apart flanges fixed to each end of said collar, each of said flanges having an aperture centrally therethrough, and
- a pair of bolts each insertable through said apertures in each of said pairs of flanges for engaging a selected link of one of said connecting chains disposed between said pair of flanges.

18. The apparatus as defined in claim 3, wherein said pipe-engaging means comprises
- a semicircular collar adapted for engaging the body of the second pipe section, the ends of said collar terminating on opposite sides of said second pipe section approximate the center line thereof,
- a gripping chain disposed about the lower periphery of the second pipe section and attachable to said opposite ends of said collar for securing said collar to said second pipe section, and
- attaching means disposed on the ends of said collar for releasably attaching each of said ends of said collar to one of said chains of said connecting means and for attaching an end of said gripping chain to each end of said collar.

19. The apparatus as defined in claim 18, wherein said attaching means comprise
- a pair of radially projecting spaced-apart flanges fixed to each end of said collar, each of said flanges having an aperture centrally therethrough,
- a pair of threaded bolts each having one end terminating in a hook, said bolts each insertable through said apertures in each of said pairs of flanges for engaging a selected link of one of said chains of said connecting means disposed between said pair of flanges, said hooked ends of said bolts projecting below the lower ones of said pairs of flanges for engaging selected links of opposite ends of said gripping chain, and
- means for engaging said threaded bolts and securing each of said bolts in said pair of flanges and for adjusting the tension of said gripping chain disposed about the lower surface of the second pipe section.

20. The apparatus as defined in claim 3, wherein said pipe-engaging means comprises an engaging chain circumferentially disposed about the surface of the second pipe section and having means for securing the chain in place, said chain ends of said connecting means being attachable to selected links of said engaging chain on opposite sides of the second pipe section.

21. The apparatus defined in claim 3, wherein said pipe-engaging means comprises
- a cross bar having a surface adapted for contacting and engaging the other open end of said second pipe section, and
- attaching means disposed on the ends of said cross bar for releasably attaching each of said ends of said cross bar to one of said chains.

22. The apparatus defined in claim 21, wherein said attaching means comprise
- a pair of radially projecting spaced-apart flanges fixed to each end of said cross bar, each of said flanges having an aperture centrally therethrough, and
- a pair of bolts each insertable through said apertures in each of said pairs of flanges for engaging a selected link of one of said connecting chains disposed between said pair of flanges.

23. The apparatus as defined in claim 22, wherein said cross bar also includes positioning means for positioning said cross bar to engage said other open end of said second pipe section generally across its horizontal diameter.

24. The apparatus as defined in claim 2, wherein said connecting means comprises
- a pair of elongated rods, one end of each of which engages one of the opposite ends of said second beam member and projects longitudinally along opposite sides of the first pipe section,
- a pair of chains, one end of each of which is attached to the other end of each one of said projecting ends of said rods and the other end of each of said chains removably attachable to said pipe-engaging means on opposite sides of said second pipe section, each of said chains cooperating with said pipe-engaging means for permitting adjustment of the length of said chains.

25. The apparatus as defined in claim 24, wherein said connecting means further comprises tensioning means cooperating with said second beam member and said pair of elongated rods for adjustably tensioning said connecting chains and said elongated rods between said second beam member and said pipe-engaging means.

26. The apparatus as defined in claim 25, wherein said tensioning means comprises
- a pair of sleeves, one of which is fixed to each end of said second beam member and projecting laterally toward said first beam member and the open end of the first pipe section, each of said sleeves accommodating said one end of each of said elongated rods, said one end of said rods being threaded and projecting through said sleeve beyond said second beam member, and
- means threadably insertable over said projecting threaded ends of said rods and engaging each of said sleeves for adjusting the length of said projecting rods and tensioning the connecting chains against said pipe-engaging means.

27. The apparatus as defined in claim 26, wherein said guide means includes a pair of sleeves, one of which is fixed to each end of said first beam member and concentrically encircles one of said projecting rods for permitting lateral displacement between said first and second beam members along the axes of said projecting rods and preventing relative rotational motion between said first and second beam members.

28. The apparatus as defined in claim 26, wherein said pipe-engaging means comprises
- a semicircular collar adapted for frictionally engaging the slanted surface of said hub end of the second pipe section, the ends of said collar terminating on opposite sides of said second pipe section approximate the center line thereof, and
- attaching means disposed on the ends of said collar for releasably attaching each of said ends of said collar to one of said chains of said connecting means.

29. The apparatus defined in claim 28, wherein said attaching means comprise
- a pair of radially projecting spaced-apart flanges fixed to each end of said collar, each of said flanges having an aperture centrally therethrough, and
- a pair of bolts each insertable through said apertures in each of said pairs of flanges for engaging a selected link of one of said connecting chains disposed between said pair of flanges.

30. The apparatus as defined in claim 26, wherein said pipe-engaging means comprises
- a semicircular collar adapted for engaging the body of the second pipe section, the ends of said collar terminating on opposite sides of said second pipe section approximate the center line thereof,
- a gripping chain disposed about the lower periphery of the second pipe section and attachable to said opposite ends of said collar for securing said collar to said second pipe section, and
- attaching means disposed on the ends of said collar for releasably attaching each of said ends of said collar to one of said chains of said connecting means and for attaching an end of said gripping chain to each end of said collar.

31. The apparatus as defined in claim 30, wherein said attaching means comprise
- a pair of radially projecting spaced-apart flanges fixed to each end of said collar, each of said flanges having an aperture centrally therethrough,
- a pair of threaded bolts each having one end terminating in a hook, said bolts each insertable through said apertures in each of said pairs of flanges for engaging a selected link of one of said chains of said connecting means disposed between said pair of flanges, said hooked ends of said bolts projecting below the lower ones of said pairs of flanges for engaging selected links of opposite ends of said gripping chain, and means for engaging said threaded bolts and securing each of said bolts in said pair of flanges and for adjusting the tension of said gripping chain disposed about the lower surface of the second pipe section.

32. The apparatus as defined in claim 26, wherein said pipe-engaging means comprises an engaging chain circumferentially disposed about the surface of the second pipe section and having means for securing the chain in place, said chain ends of said connecting means being attachable to selected links of said engaging chain on opposite sides of the second pipe section.

33. The apparatus defined in claim 26, wherein said pipe-engaging means comprises a cross bar having a surface adapted for contacting and engaging the other open end of said second pipe section, and attaching means disposed on the ends of said cross bar for releasably attaching each of said ends of said cross bar to one of said chains.

34. The apparatus defined in claim 33, wherein said attaching means comprise a pair of radially projecting spaced-apart flanges fixed to each end of said cross bar, each of said flanges having an aperture centrally therethrough, and a pair of bolts each insertable through said apertures in each of said pairs of flanges for engaging a selected link of one of said connecting chains disposed between said pair of flanges.

35. The apparatus as defined in claim 34, wherein said cross bar also includes positioning means for positioning said cross bar to engage said other open end of said second pipe section generally across its horizontal diameter.

36. The apparatus as defined in claim 2, wherein said first pipe section has an L-shaped configuration with an outer arcuate bend and said driving means further includes lug-engaging means disposed on said first beam member for engaging a lug disposed on said outer radius of the arcuate bend of said first pipe section.

37. The apparatus as defined in claim 36, wherein said lug-engaging means comprises a pair of spaced ribs projecting from the pipe-engaging surface of said first beam member and centrally located thereon for straddling and engaging said lug to prevent transverse sliding of said beam member with respect to said first pipe section.

38. The apparatus as defined in claim 36, wherein said lug-engaging means comprises a shoe member having a concave engaging surface for contacting and frictionally engaging the arcuate surface of said first pipe section adjacent said lug, said shoe attached centrally to the pipe-engaging surface of said first beam member and having a longitudinal slot therein for accepting and engaging said lug to prevent transverse sliding of said shoe member and said beam member with respect to said first pipe section.

39. A pipe-seating apparatus for seating the spigot end of a first pipe section into the hub or receiving end of a second pipe section against a flexible seal, comprising pipe-engaging means for securely engaging the second pipe section, a first beam member having a surface adapted for contact with said other open end of the first pipe section, a second beam member spaced from and positioned generally parallel to said first beam member, a pair of J-shaped tubing sections each fixed to opposite ends of said second beam member with the straight portion of said J-shaped tubing sections extending toward said first beam member and the curved ends of said J-shaped tubing sections projecting around the ends of said second beam member in a facing spaced relationship for forming a generally U-shaped guide, a length of cable threaded through said J-shaped tubing sections for forming a generally U-shaped loop having a pair of extending ends positioned on opposite sides of the first pipe section, a pair of chains, one end of each of which is attached to one of said extending ends of said cable and the other end of each of said chains removably attachable to said pipe-engaging mans on opposite sides of said second pipe section, each of said chains cooperating with said pipe-engaging means for permitting adjustment of the length of said chains between said cable end and said pipe-engaging means, driving means disposed between and engaging said spaced first and second beam members and for laterally displacing said first beam member from said second beam member for tensioning said cable and the attached chains against said pipe-engaging means and driving said first pipe section axially into said second pipe section, and a pair of straight tubing sections fixed to opposite ends of said first beam member for extending toward said spaced bar and disposed concentrically over the extending portions of said J-shaped tubing sections attached to said second beam member for permitting lateral displacement between said first and second beam members along the axes of said J-shaped and straight tubing sections and preventing relative rotational motion between said first and second beam members.

40. The apparatus defined in claim 39, wherein said driving means comprises jacking means disposed between and attached to said first and second beam members.

41. The apparatus defined in claim 40, wherein said jacking means comprises a mechanically operated hydraulic jack.

42. The apparatus defined in claim 40, wherein said jacking means comprises a mechanically operated ratchet jack.

43. The apparatus defined in claim 41, wherein said jacking means comprises a fluid-operated piston and cylinder assembly, a source of pressurized fluid connected to said piston and cylinder assembly, and valve means interconnected between said fluid source and said piston and cylinder assembly for controlling the operation of said assembly.

44. The apparatus defined in claim 39, further including an elongated support bar spaced from said first beam member and extending forwardly therefrom for engaging the outer surface of said other open end of the first pipe section, a connecting member fixed to said support bar and extending therefrom toward said first beam member, and adjusting means fixed to said first beam member and cooperating with said connecting member for adjusting the spacing between said support bar and said first beam member for positioning said first beam member centrally of said other open end of the first pipe section.

45. The apparatus as defined in claim 44, wherein said adjusting means comprises a cylindrical tube fixed centrally and transversely to said first beam member and registering with an aperture in said first beam member, said connecting member comprising a threaded rod, the extending end of which is insertable through said tube and said first beam member aperture, and a threaded nut fixed to the extending end of said tube for accepting and adjustably engaging said threaded rod.

46. The apparatus as defined in claim 39, wherein said pipe-engaging means comprises a semicircular collar adapted for frictionally engaging the shoulder of the hub of the second pipe section, the ends of said collar terminating on opposite sides of said second pipe section approximate the center line thereof, and attaching means disposed on the ends of said collar for releasably attaching each of said ends of said collar to one of said chains.

47. The apparatus defined in claim 46, wherein said attaching means comprise a pair of radially projecting spaced-apart flanges fixed to each end of said collar, each of said flanges having an aperture centrally therethrough, and a pair of bolts each insertable through said apertures in each of said pairs of flanges for engaging a selected length of one of said chains disposed between said pair of flanges.

48. The apparatus as defined in claim 39, wherein said pipe-engaging means comprises a semicircular collar adapted for engaging the body of the second pipe section, the ends of said collar terminating on opposite sides of said second pipe section approximate the center line thereof, a gripping chain disposed about the lower periphery of the second pipe section and attachable to said opposite ends of said collar for securing said collar to said second pipe section, and attaching meand disposed on the ends of said collar for releasably attaching each of said ends of said collar to one of said cable chains and for attaching an end of said gripping chain to each end of said collar.

49. The apparatus as defined in claim 48, wherein said attaching means comprise a pair of radially projecting spaced-apart flanges fixed to each end of said collar, each of said flanges having an aperture centrally therethrough, a pair of threaded bolts each having one end terminating in a hook, said bolts each insertable through said apertures in each of said pairs of flanges for engaging a selected link of one of said cable chains disposed between said pair of flanges, said hooked ends of said bolts projecting below the lower one of said pairs of flanges for engaging selected links of opposite ends of said gripping chain, and means for engaging said threaded bolts and securing each of said bolts in said pair of flanges and adjusting the tension of said gripping chain disposed about the lower surface of the second pipe section.

50. The apparatus as defined in claim 39, wherein said pipe-engaging means comprises an engaging chain circumferentially disposed about the surface of the second pipe section and having means for securing said chain in place, said ends of said cable chains attachable to selected links of said engaging chain on opposite sides of the second pipe section.

51. The apparatus as defined in claim 39, wherein said first pipe section has an L-shaped configuration with an arcuate bend and a projecting lug disposed on the outer radius of the bend of said pipe section, and wherein said first beam member further includes a pair of spaced ribs projecting from the pipe-engaging surface of said first beam member and centrally located thereon for straddling and engaging said lug to prevent transverse sliding of said first beam member with respect to the first pipe section.

52. The apparatus as defined in claim 39, wherein said first pipe section has an L-shaped configuration with an arcuate bend and a projecting lug disposed on the outer radius of the bend of said first pipe section and said first beam member further includes a shoe member having a concave engaging surface for contacting and frictionally engaging the surface of said arcuate bend of the first pipe section adjacent said lug, said shoe member attached centrally to said beam member pipe-engaging surface and having a longitudinal slot therein for accepting and engaging said lug to prevent transverse sliding of said first beam member with respect to the first pipe section.

* * * * *

UNITED STATES PATENT OFFICE
CERTIFICATE OF CORRECTION

Patent No. 3,927,457  Dated December 23, 1975

Inventor(s) Alton H. Bickle

It is certified that error appears in the above-identified patent and that said Letters Patent are hereby corrected as shown below:

Column 1, line 33, change "weight" to -- weigh --.

Column 4, line 61, insert a colon -- : -- after "ponents".

Column 6, line 8, change "operate" to -- cooperate --.

Column 8, line 19, change "conjunction" to -- connection --.

Column 8, line 53, change "used" to -- use --.

Column 9, line 17, insert -- end -- after "pipe".

Column 9, line 42, change "connectng" to -- connecting --.

Column 10, line 17, change "suppoprt" to -- support --.

Column 10, line 65, insert -- piston -- before "rod".

Column 11, line 55, insert -- removable -- before "attaching".

Column 18, line 23 change "mans" to -- means --.

Column 19, line 51, change "meand" to -- means -- .

Signed and Sealed this sixth Day of April 1976

[SEAL]

Attest:

RUTH C. MASON
Attesting Officer

C. MARSHALL DANN
Commissioner of Patents and Trademarks